(12) United States Patent
Thomas et al.

(10) Patent No.: US 10,788,136 B1
(45) Date of Patent: Sep. 29, 2020

(54) DAMPER VALVE ASSEMBLY

(71) Applicant: Tenneco Automotive Operating Company Inc., Lake Forest, IL (US)

(72) Inventors: Stephen M. Thomas, Laingsburg, MI (US); Danny D. Alexander, Horton, MI (US)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 0 days.

(21) Appl. No.: 16/370,179

(22) Filed: Mar. 29, 2019

(51) Int. Cl.
*F16K 15/00* (2006.01)
*F16K 15/03* (2006.01)
*F01N 1/16* (2006.01)

(52) U.S. Cl.
CPC ............ *F16K 15/033* (2013.01); *F01N 1/165* (2013.01); *F01N 2240/36* (2013.01); *F01N 2260/16* (2013.01); *Y10T 137/7902* (2015.04); *Y10T 137/7903* (2015.04)

(58) Field of Classification Search
CPC ......... Y10T 137/7902; Y10T 137/7903; Y10T 137/7898; F16K 15/03
See application file for complete search history.

(56) References Cited

U.S. PATENT DOCUMENTS

| | | | | |
|---|---|---|---|---|
| 215,887 A * | 5/1879 | Crossman et al. | ...... | F16K 15/03 137/527.8 |
| 377,963 A * | 2/1888 | Smith | ...... | F16K 15/03 137/527.4 |
| 468,985 A * | 2/1892 | Downs | ...... | F16K 15/03 137/527.8 |
| 1,063,637 A * | 6/1913 | Barker | ...... | E21B 33/0355 137/236.1 |
| 1,337,326 A * | 4/1920 | Rice | ...... | F02M 1/00 137/527.8 |
| 1,348,562 A * | 8/1920 | Hauser | ...... | F16K 15/03 137/527.8 |
| 1,354,244 A * | 9/1920 | Clifford | ...... | E03D 9/031 4/226.1 |

(Continued)

FOREIGN PATENT DOCUMENTS

| CN | 10248256 A | 4/2012 |
|---|---|---|
| EP | 2738365 A1 | 6/2014 |

(Continued)

OTHER PUBLICATIONS

Office Action in Corresponding CN Application No. 2017800495472 dated Jun. 2, 2020 (in Chinese with English Translation).

*Primary Examiner* — Robert K Arundale
(74) *Attorney, Agent, or Firm* — Harness, Dickey & Pierce, P.L.C.

(57) ABSTRACT

A damper valve assembly for an exhaust system of a vehicle includes a valve housing and a valve flap. The valve housing is adapted to be attached to a pipe of the exhaust system and defines an opening. The valve flap is rotatable relative to the valve housing and about a pivot axis between a first position whereat fluid flow through the opening of the valve housing is restricted and a second position whereat fluid flow through the opening of the valve housing is allowed. The valve flap includes a body and a mass damper. The mass damper is integral with the body and includes a plurality of segments that are folded so that the plurality of segments are in a stacked arrangement.

20 Claims, 11 Drawing Sheets

(56) References Cited

U.S. PATENT DOCUMENTS

| | | |
|---|---|---|
| 1,517,335 A | 12/1924 | Zinis |
| 2,824,755 A | 2/1958 | Lamphear |
| 3,128,785 A * | 4/1964 | Krummel ............... F16K 15/033 137/315.33 |
| 3,565,099 A * | 2/1971 | Huber ................... F16K 5/0407 137/269.5 |
| 3,726,308 A * | 4/1973 | Eberhardt ........... F04D 15/0072 137/527.8 |
| 4,254,752 A | 3/1981 | Friddell et al. |
| 4,541,506 A | 9/1985 | Venning et al. |
| 4,858,738 A | 8/1989 | Novoa |
| 5,355,673 A | 10/1994 | Sterling et al. |
| 5,669,350 A | 9/1997 | Altmann et al. |
| 5,744,762 A | 4/1998 | Seki et al. |
| 5,884,898 A | 3/1999 | Miyairi |
| 6,003,490 A | 12/1999 | Kihara et al. |
| 6,047,950 A | 4/2000 | Pontoppidan et al. |
| 6,085,781 A | 7/2000 | Boutry |
| 6,152,173 A * | 11/2000 | Makowan ............... F16K 15/03 137/527 |
| 6,338,246 B2 | 1/2002 | Eguchi et al. |
| 6,527,006 B2 | 3/2003 | Jackson |
| 6,736,160 B2 | 5/2004 | Nagai et al. |
| 7,310,942 B2 | 12/2007 | Shiga et al. |
| 7,451,854 B2 | 11/2008 | Suzuki et al. |
| 7,802,424 B2 | 9/2010 | Kanzawa et al. |
| 7,896,130 B2 | 3/2011 | Hill et al. |
| 8,201,660 B2 | 6/2012 | Han et al. |
| 8,256,454 B2 | 9/2012 | Xu et al. |
| 8,448,627 B2 | 5/2013 | Kondo et al. |
| 8,453,672 B2 | 6/2013 | Abram et al. |
| 8,468,813 B2 | 6/2013 | Hill et al. |
| 8,657,065 B1 | 2/2014 | Hill |
| 8,800,263 B2 | 8/2014 | Eder et al. |
| 9,121,315 B2 | 9/2015 | Abram et al. |
| 9,376,947 B2 | 6/2016 | Abram et al. |
| 9,464,559 B2 | 10/2016 | Middleton, Jr. et al. |
| 9,540,995 B2 | 1/2017 | Houtschilt et al. |
| 9,624,837 B2 | 4/2017 | Abram |
| 9,982,794 B2 * | 5/2018 | Thomas ................ B23P 15/002 |
| 10,151,212 B2 | 12/2018 | Pless |
| 10,180,092 B2 | 1/2019 | Geer et al. |
| 2002/0162983 A1 | 11/2002 | Bailey |
| 2005/0211221 A1 | 9/2005 | Matsuda |
| 2007/0095406 A1 * | 5/2007 | Colton, Jr. .......... F16K 37/0008 137/553 |
| 2008/0223025 A1 | 9/2008 | Hill |
| 2009/0116938 A1 * | 5/2009 | Wakabayashi .......... F16K 15/03 414/217.1 |
| 2009/0126356 A1 | 5/2009 | Abram et al. |
| 2010/0263211 A1 | 10/2010 | Sahs et al. |
| 2010/0263743 A1 | 10/2010 | Lefler et al. |
| 2010/0313554 A1 | 12/2010 | Abram |
| 2011/0290349 A1 * | 12/2011 | Cozens .................. E03F 5/042 137/527.6 |
| 2013/0056083 A1 | 3/2013 | Abram et al. |
| 2013/0232961 A1 | 9/2013 | Abram |
| 2013/0299004 A1 | 11/2013 | Abram |
| 2014/0053923 A1 * | 2/2014 | Martinelli ............. F16K 15/033 137/527.8 |
| 2014/0246617 A1 | 9/2014 | Diel |
| 2015/0162760 A1 | 6/2015 | Clark |
| 2016/0032794 A1 | 2/2016 | Fischer et al. |
| 2017/0204756 A1 | 7/2017 | Middleton, Jr. et al. |
| 2018/0051607 A1 | 2/2018 | Geer et al. |
| 2018/0051610 A1 | 2/2018 | Thomas et al. |
| 2018/0238459 A1 * | 8/2018 | Nowell ................... F16K 15/03 |

FOREIGN PATENT DOCUMENTS

| | | |
|---|---|---|
| JP | H1030444 A | 2/1998 |
| JP | 2006009667 A | 1/2006 |
| JP | 2016079807 A | 5/2016 |
| KR | 101000903 B1 | 12/2010 |
| KR | 101298481 B1 | 8/2013 |
| KR | 20150008563 A | 1/2015 |
| KR | 20150051350 A | 5/2015 |
| WO | 2010135095 A2 | 11/2010 |
| WO | 20150027566 A1 | 3/2015 |
| WO | WO-2016111326 A1 | 7/2016 |

* cited by examiner

DAMPER VALVE ASSEMBLY

FIELD

The present disclosure relates to a damper valve assembly.

BACKGROUND

This section provides background information related to the present disclosure and is not necessarily prior art.

Many vehicle exhaust systems use active and/or passive valve assemblies to alter the characteristics of exhaust flow through a conduit as the exhaust pressure increases due to increasing engine speed. Such valves can be used to reduce low frequency noise by directing exhaust through mufflers or other exhaust system components. For example, valves can direct exhaust flow past obstructions, which create vortices that absorb low frequency sound energy.

Active valves carry the increased expense of requiring a specific actuating element, such as a solenoid. By contrast, passive valves generally include a spring biased valve flap and utilize the pressure of the exhaust flow in the conduit to actuate (i.e., open) the valve. Although passive valves are less expensive, traditional passive valves can be difficult to manufacture and are susceptible to vibration related noise and excessive valve flutter caused by flowrate fluctuations in the engine's exhaust flow (i.e., exhaust pulsation). Such valves can present vibration and noise problems due to resonance of the valve flap and biasing spring. As a result, there remains a need for improved passive valves.

SUMMARY

This section provides a general summary of the disclosure, and is not a comprehensive disclosure of its full scope or all of its features.

In one form, the present discloses provides a damper valve assembly for an exhaust system of a vehicle that includes a valve housing and a valve flap. The valve housing is adapted to be attached to a pipe of the exhaust system and defines an opening. The valve flap is rotatably coupled to the valve housing about a pivot axis. The valve flap movable between a first position whereat fluid flow through the opening of the valve housing is restricted and a second position whereat fluid flow through the opening of the valve housing is allowed. The valve flap includes a body and a mass damper. The mass damper is integral with the body and includes a plurality of segments that are folded so that the plurality of segments are in a stacked arrangement.

In some configurations of the damper valve assembly of the above paragraph, the mass damper is pressed to a first surface of the body of the valve flap once the plurality of segment are folded.

In some configurations of the damper valve assembly of any one or more of the above paragraphs, a pad is attached to one of a second surface of the body and the valve housing. The pad is sealingly engaged with the valve housing and the valve flap along a periphery of the opening when the valve flap is in the first position.

In some configurations of the damper valve assembly of any one or more of the above paragraphs, the plurality of segments are parallel to each other and to the body of the valve flap.

In some configurations of the damper valve assembly of any one or more of the above paragraphs, the plurality of segments are folded about fold lines such that bends are created.

In some configurations of the damper valve assembly of any one or more of the above paragraphs, one bend at least partially wraps around another bend.

In some configurations of the damper valve assembly of any one or more of the above paragraphs, the valve flap includes a first rim portion extending at least partially around a periphery of the body and the valve housing includes a second rim portion extending at least partially around a periphery of a valve seat. First and second slots in the first and second rim portions, respectively, accommodate the mass damper.

In some configurations of the damper valve assembly of any one or more of the above paragraphs, the valve flap is in the first position when a pressure drop of fluid in the pipe is below a predetermined threshold and is in the second position when the pressure drop of fluid in the pipe is above a predetermined threshold.

In another form, the present disclosure provides a damper assembly for an exhaust system of a vehicle that includes a valve housing, a shaft, a valve flap and a torsional spring. The valve housing is adapted to be attached to a pipe of the exhaust system and defines an opening. The shaft is rotatably coupled to the valve housing. The valve flap is rotatable about a pivot axis of the shaft between a first position whereat fluid flow through the opening of the valve housing is restricted and a second position whereat fluid flow through the opening of the valve housing is allowed. The valve flap includes a body and a mass damper. The torsional spring engages the valve flap to bias the valve flap toward the first position. The mass damper is integral with the body at a periphery thereof and includes a plurality of segments that are folded so that the plurality of segments are in a stacked arrangement.

In some configurations of the damper valve assembly of the above paragraph, the mass damper is pressed to a first surface of the body of the valve flap once the plurality of segment are folded.

In some configurations of the damper valve assembly of any one or more of the above paragraphs, a pad is attached to a second surface of the body along a periphery thereof. The pad is sealingly engaged with the valve housing along a periphery of the opening when the valve flap is in the first position.

In some configurations of the damper valve assembly of any one or more of the above paragraphs, the plurality of segments are parallel to each other and to the body of the valve flap.

In some configurations of the damper valve assembly of any one or more of the above paragraphs, the plurality of segments are folded about fold lines such that bends are created and one of the bends at least partially wraps around another one of the bends.

In some configurations of the damper valve assembly of any one or more of the above paragraphs, the valve flap includes a first rim portion extending at least partially around a periphery of the body and the valve housing includes a second rim portion extending at least partially around a periphery of a valve seat. First and second slots in the first and second rim portions, respectively, accommodate the mass damper.

In some configurations of the damper valve assembly of any one or more of the above paragraphs, the valve flap is in the first position when a pressure drop of fluid in the pipe is below a predetermined threshold and is in the second position when the pressure drop of fluid in the pipe is above a predetermined threshold.

In some configurations of the damper valve assembly of any one or more of the above paragraphs, the valve flap includes a first rim portion extending at least partially around a periphery of the body and the valve housing includes a second rim portion extending at least partially around a periphery of a valve seat. The mass damper extends through first and second slots in the first and second rim portions, respectively.

In some configurations of the damper valve assembly of any one or more of the above paragraphs, one of the segments includes a clip extending therefrom. The torsional spring is disposed around the shaft and is engaged to the shaft and the clip to bias the valve flap toward the first position.

In some configurations of the damper valve assembly of any one or more of the above paragraphs, the valve housing includes a bracket portion extending therefrom. The torsional spring is disposed around the shaft and is engaged to the bracket portion and a surface of the body to bias the valve flap toward the first position.

In some configurations of the damper valve assembly of any one or more of the above paragraphs, the valve flap is in the first position when a pressure drop of fluid in the pipe is below a predetermined threshold and is in the second position when the pressure drop of fluid in the pipe is above a predetermined threshold.

In some configurations of the damper valve assembly of any one or more of the above paragraphs, the shaft includes a retainer to fix the shaft at more than one rotational position relative to the valve housing. The rotational position of the shaft varying a preload on the torsional spring when the valve flap is in the first position.

In some configurations of the damper valve assembly of any one or more of the above paragraphs, wherein the valve housing includes a plurality of attachment points and the torsional spring includes an end coupled to one of the plurality of attachment points. A preload on the torsional spring has a magnitude that varies based on which one of the plurality of attachment points the end of the torsional spring is attached.

In yet another form, the present disclosure provides a damper assembly for an exhaust system of a vehicle that includes a valve housing, a shaft, a valve flap and a torsional spring. The valve housing is adapted to be attached to an end of a pipe of the exhaust system. The valve housing includes a valve seat and an opening. The shaft is coupled to the valve housing. The valve flap rotatable between a first position whereat the valve flap engages the valve seat and fluid flow through the opening of the valve housing is restricted and a second position whereat the valve flap is spaced apart from the valve seat and fluid flow through the opening of the valve housing is allowed. The valve flap includes a body and a mass damper. The torsional spring engages the valve flap to bias the valve flap toward the first position.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
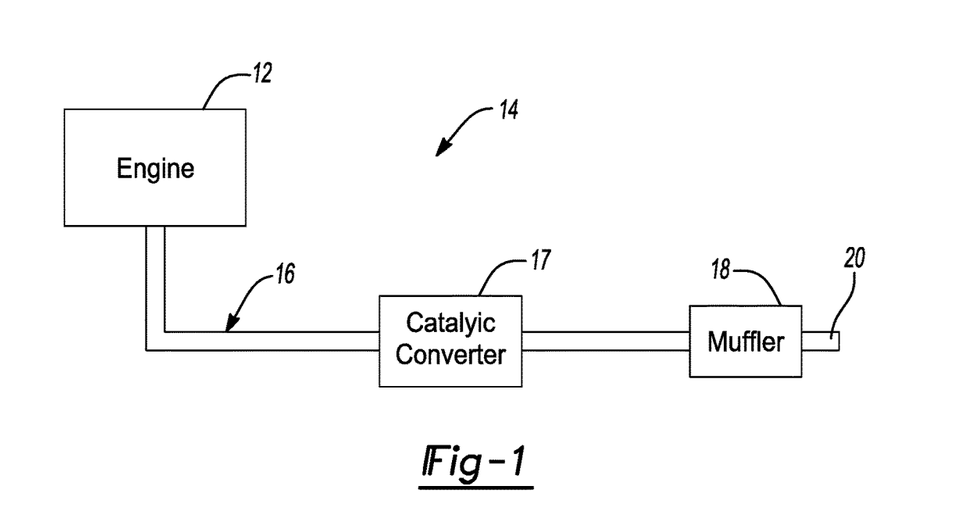
FIG. 1 is a schematic representation of an engine and an exhaust system according to the principles of the present disclosure.

As shown in FIG. 1, an engine 12 and an exhaust system 14 are shown schematically. The engine 12 may be an internal combustion engine associated with a vehicle (not shown), for example. Exhaust gas may be discharged from the engine 12 and may subsequently flow through the exhaust system 14. The exhaust system 14 may include an exhaust pipe 16, a catalytic converter 17, a muffler 18 and a tailpipe 20. Exhaust gas discharged from the engine 12 may flow through the exhaust pipe 16, the catalytic converter 17, the muffler 18, and may exit through the tailpipe 20.

Figure 2:
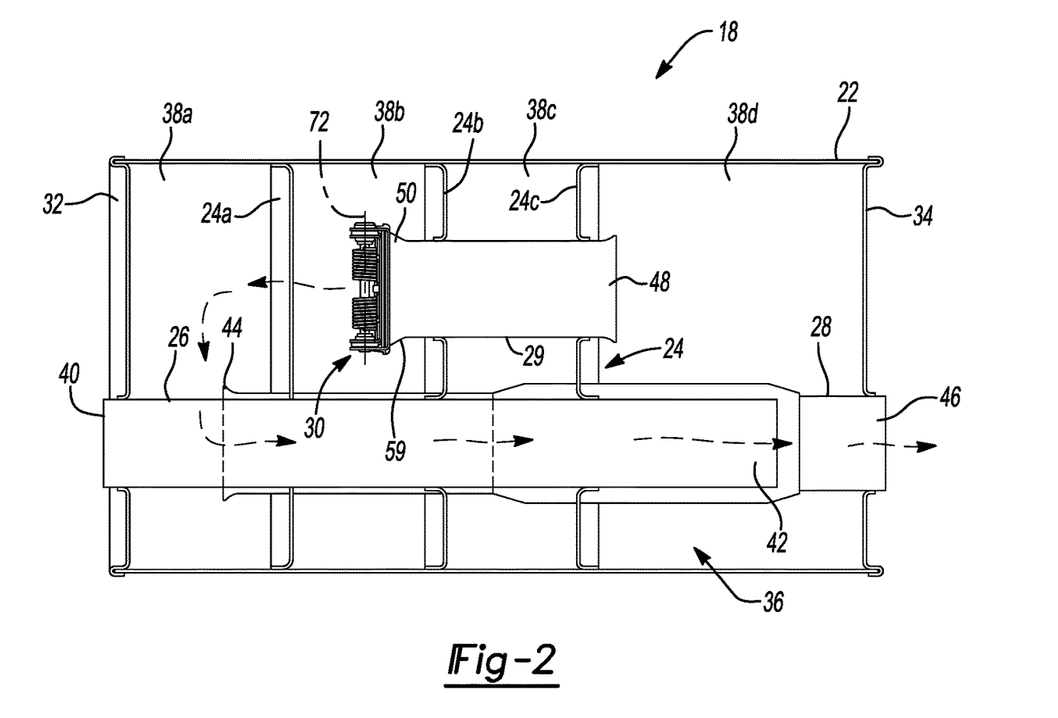
FIG. 2 is a cross-sectional view of a muffler of the exhaust system having a damper valve assembly disposed therein.
Figure 3:
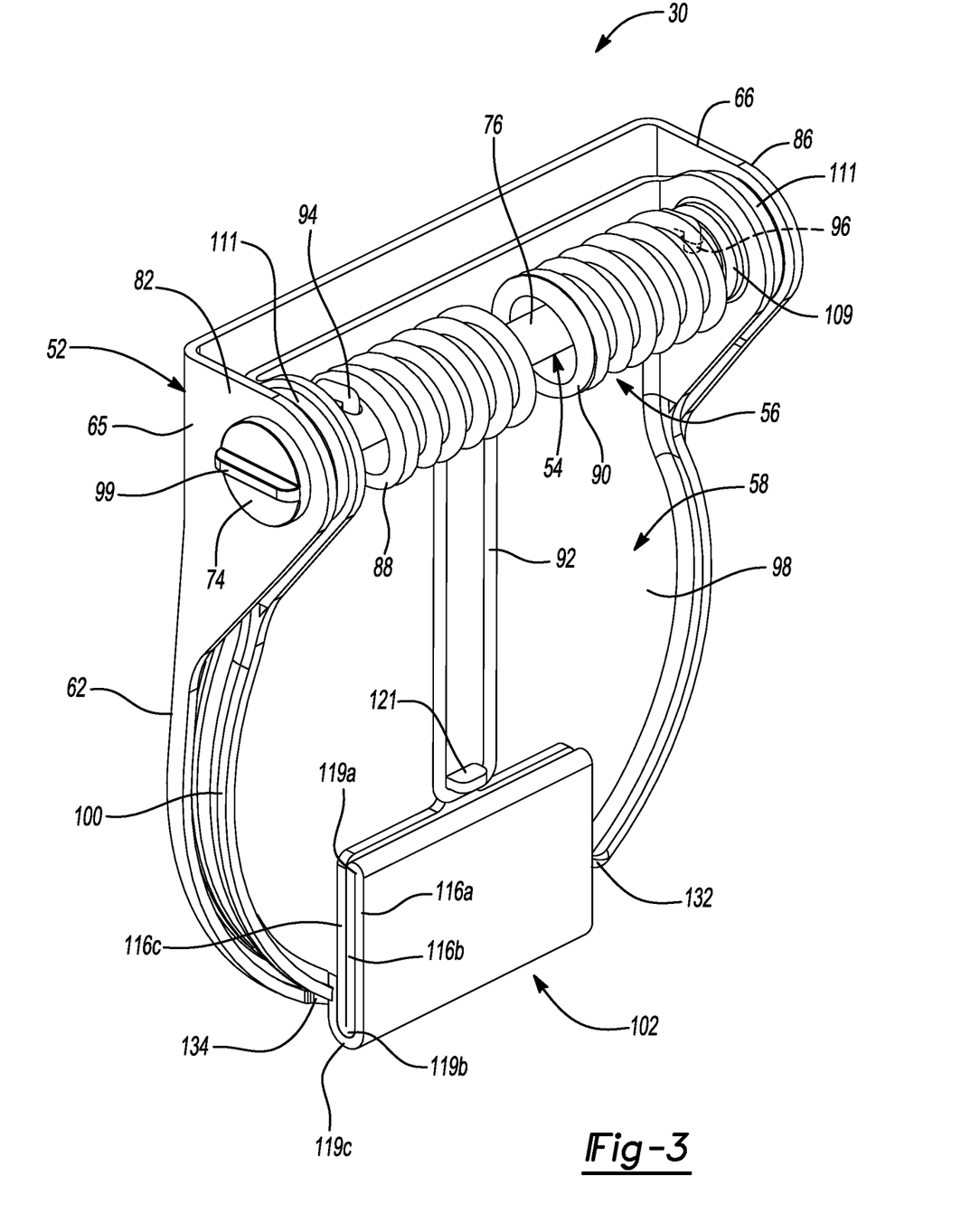
FIG. 3 is a perspective view of the damper valve assembly of FIG. 2 in a closed position.

The muffler 18 includes a shell 22, a plurality of internal partitions 24 (comprising first, second and third internal partitions 24a, 24b, 24c), an inlet pipe 26, an outlet pipe 28, a valve pipe 29 and a damper valve assembly 30. A first end cap 32 and a second end cap 34 may be fixed to respective axial ends of the shell 22 and may cooperate with the shell 22 to define an internal volume 36. The first and second end caps 32, 34 may be welded, mechanically locked, or otherwise sealingly fixed onto the axial ends of the shell 22. In some configurations, the shell 22 could have a "clamshell" configuration whereby the shell 22 includes two shell halves (or two shell portions) that are welded, mechanically locked, or otherwise sealingly fixed together. In some of such configurations, some or all of each end cap 32, 34 could be integrally formed with or attached to the shell halves (or portions) of the shell 22.

The plurality of internal partitions 24 may be disposed within the shell 22 and between the first and second end caps 32, 34. That is, the plurality of internal partitions 24 may be disposed within the internal volume 36 and may divide the internal volume 36 into a plurality of chambers 38 (comprising a first chamber 38a, a second chamber 38b, a third chamber 38c and a fourth chamber 38d. Any one or more of the plurality of chambers 38 may be at least partially filled with sound absorbing material (e.g., fiberglass).

The inlet pipe 26 may extend parallel to the outlet pipe 28 and the valve pipe 29 and perpendicular to the plurality of internal partitions 24. The inlet pipe 26 may be offset from the outlet pipe 28 (i.e., the pipes 26, 28 are not concentric to each other). The inlet pipe 26 may be at least partially disposed within the first, second, third and fourth chambers 38a, 38b, 38c, 38d and may extend through the first end cap 32 and the first, second, and third internal partitions 24a, 24b, 24c. The inlet pipe 26 may include an inlet opening 40, intermediate openings (not shown) and an outlet opening 42. The inlet opening 40 may be in fluid communication with the exhaust pipe 16 and may receive exhaust gas flowing through the exhaust pipe 16. The intermediate openings may be in fluid communication with the plurality of chambers 38. The outlet opening 42 may be in fluid communication with the fourth chamber 38d. In some configurations, the intermediate openings (not shown) may also be in fluid communication with the first, second and/or fourth chambers 38a, 38b, 38d.

The outlet pipe 28 may extend perpendicular to the plurality of internal partitions 24. The outlet pipe 28 may be at least partially disposed within the first, second, third and fourth chambers 38a, 38b, 38c, 38d and may extend through the second end cap 34 and the first, second and third internal partitions 24a, 24b, 26c. The outlet pipe 28 may include an inlet opening 44 and an outlet opening 46. The inlet opening 44 may be in fluid communication with the first chamber 38a. The outlet opening 46 may be in fluid communication with the tailpipe 20 such that fluid flowing through the outlet opening 46 may exit the tailpipe 20 into the ambient environment. In some configurations, the outlet pipe may include intermediate openings (not shown) that are in fluid communication with one or more of the plurality of chambers 38.

The valve pipe 29 may be at least partially disposed within the second, third and fourth chambers 38b, 38c, 38d and may extend through the second and third internal partitions 24b, 24c. The valve pipe 29 may include an inlet opening 48 and an outlet opening 50. The inlet opening 48 may be in fluid communication with the fourth chamber 38d and the outlet opening 50 may be in fluid communication with the second chamber 38b. Exhaust gas exiting the valve pipe 29 and the damper valve assembly 30 (see dotted arrows in FIG. 2) may flow to the outlet pipe 28 where it exits into the ambient environment (via the outlet opening 46 and the tailpipe 20).

With reference to FIGS. 3-8, the damper valve assembly 30 may include a valve housing 52 (FIGS. 3-5), a shaft 54 (FIGS. 3-5), a torsional spring 56 (FIGS. 3-5) and a valve flap 58. The valve housing 52 is attached (e.g., welded) to a flared end 59 of the valve pipe 29 at or near the outlet opening 50. The valve housing 52 may include a valve seat 60 and a rim portion 62. The valve seat 60 may define a generally circular opening 64. The valve seat 60 may include a plurality of rectangular-shaped tabs 63 that extend into the opening 64. The tabs 63 may be spaced apart 120 degrees from each other. The tabs 63 may act as a stop to prevent the valve pipe 29 from extending into the opening 64. The tabs 63 may also be used as a locating feature (i.e., rotationally positioning the valve pipe 29 relative to the valve housing 52) such that the valve pipe 29 and the valve housing 52 may be attached (e.g., welded) to each other at the tabs 63.

Figure 5:
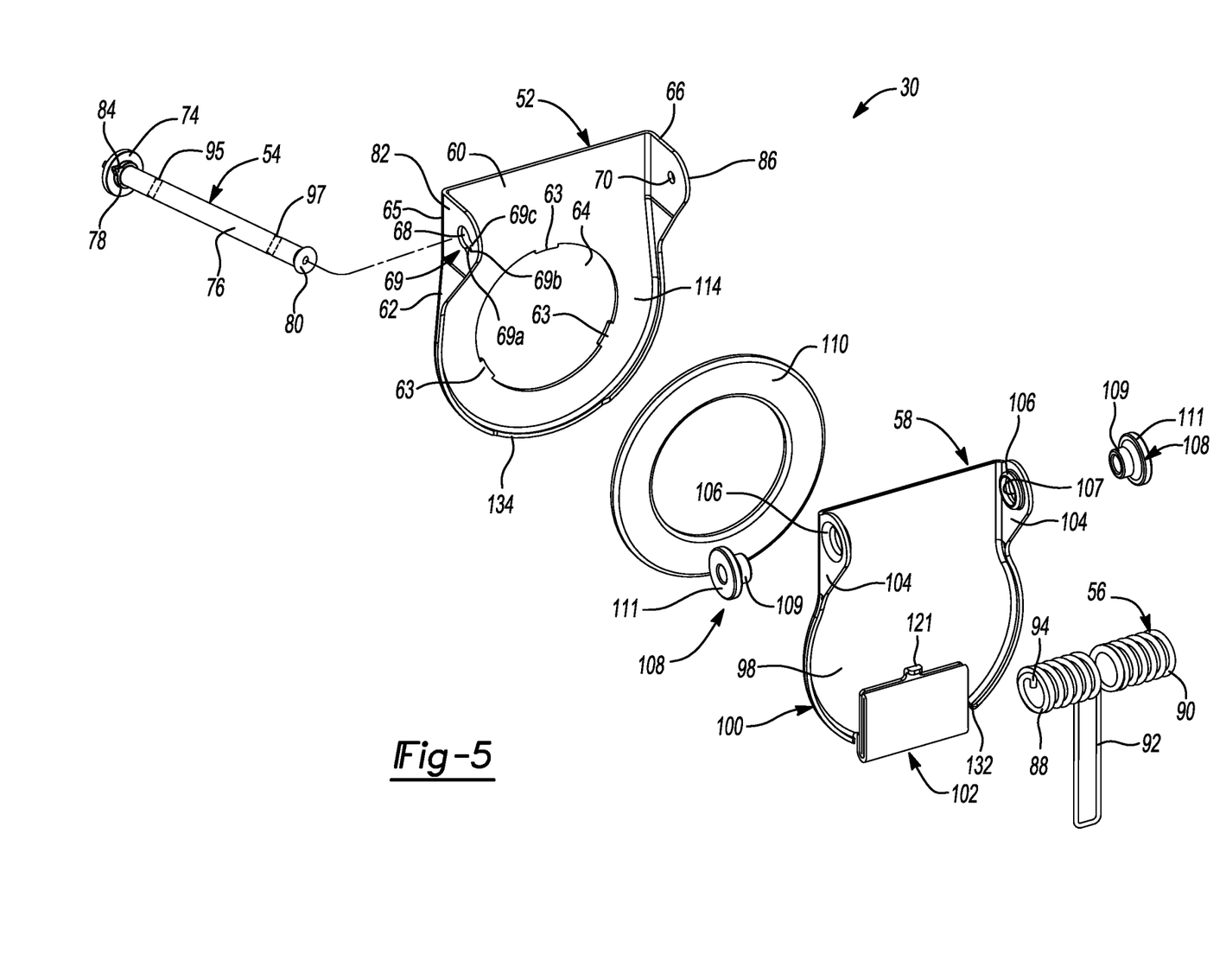
FIG. 5 is an exploded perspective view of the damper valve assembly.

The rim portion 62 may extend at least partially around a periphery of the valve seat 60. The rim portion 62 may be attached (e.g., welded) to the flared end 59 of the valve pipe 29 at or near the outlet opening 50. As shown in FIG. 5, opposing ends or flanges 65, 66 of the rim portion 62 may include openings 68, 70, respectively, that are aligned with each other. The opening 70 may have a smaller diameter than a diameter of the opening 68. Triangular-shaped notches 69 (comprised of a first notch 69a, a second notch 69b and a third notch 69c) may be formed in the end 65 of the rim portion 62 at a periphery of the opening 68.

The shaft 54 may extend transverse (i.e., perpendicular relative to a longitudinal direction of the valve pipe 29) to the valve pipe 29 and may have an axis 72 (FIG. 2) that is offset from the opening 64 in the valve seat 60. The shaft 54 may extend through the valve flap 58 and through the openings 68, 70 of the opposing ends 65, 66, respectively. The shaft 54 may include a head portion 74, a body portion 76, a tuning portion or retainer 78 (FIG. 5) and a flange 80. The head portion 74 may be in contact with an outer surface 82 of the end 65 of the rim portion 62. The tuning portion 78 may be positioned between the head portion 74 and the body portion 76 and may include a projection 84 that is received in one of the notches 69a, 69b, 69c formed in the end 66 of the rim portion 62 at the periphery of the opening 70. When the shaft 54 extends through the valve flap 58 and through openings 68, 70 of the opposing ends 65, 66, an end portion of the shaft 54 may be mechanically deformed to form the radially extending flange 80. The flange 80 may be in contact with an outer surface 86 of the end 66 of the rim portion 62.

The torsional spring 56 may be disposed around the body portion 76 of the shaft 54 and may include a first coil 88, a second coil 90 and a U-shaped connecting portion 92. An end 94 of the first coil 88 may be engaged with the body portion 76 of the shaft 54 (i.e., the end 94 is disposed in an aperture 95 of the body portion 76) and an end 96 of the second coil 90 may also be engaged with the body portion 76 of the shaft 54 (i.e., the end 96 is disposed in an aperture 97 of the body portion 76). The connecting portion 92 may be positioned between the first and second coils 88, 90 and may be coupled to the valve flap 58. In this way, the valve flap 58 is rotationally biased toward a first position (i.e., closed position).

The pressure drop (differential between chamber 38d and chamber 38b) causing the valve flap 58 to move from the first position toward a second position (i.e., an open position) may be varied depending on the notch 69a, 69b, 69c that the projection 84 is received in. A torsional spring preload is set based on the attachment position of the projection 84 of the tuning portion 78 of the shaft 54. Different attachment points provide a different torsional spring preload. For example, if the projection 84 is disposed in the notch 69a then a lesser pressure differential between chamber 38d and chamber 38b would be required to move the valve flap 58 from the closed position to the open position then if the projection 84 is disposed in the notch 69b. Similarly, if the projection 84 is disposed in the notch 69b then a lesser pressure differential between chamber 38d and chamber 38b would be required to move the valve flap 58 from the closed position to the open position then if the projection 84 is disposed in the notch 69c. A gripping member or handle 99 (FIG. 3) on the head portion 74 of the shaft 54 may be used to move the projection 84 between notches 69a, 69b, 69c.

The valve flap 58 may be coupled for rotation with the shaft 54. The valve flap 58 may be rotatable about the axis 72 of the shaft 54 between the first position (i.e., closed position) whereat fluid flowing in the valve pipe 29 is restricted from flowing through the outlet opening 50 of the valve pipe 29 and the second position (i.e., open position) whereat fluid in the valve pipe 29 is allowed to flow through the outlet opening 50 of the valve pipe 29.

As shown in FIGS. 3-8, the valve flap 58 may include a body 98, a rim portion 100 and a mass damper 102. The rim portion 100 may extend at least partially around a periphery of the body 98. Opposing ends 104 of the rim portion 100 may include a trunnion 106. A wire-mesh bushing 108 may be disposed on opposing ends of the body portion 76 of the shaft 54 to rotatably support the shaft 54. Each wire-mesh bushing 108 may include a cylindrically-shaped central portion 109 and a peripheral portion 111 that extends around and radially outwardly from a periphery of the central portion 109. The central portion 109 of the wire-mesh bushing 108 may be disposed within an opening 107 of each trunnion 106. The peripheral portion 111 of the wire-mesh bushing 108 may be disposed between the rim portion 100 of the valve flap 58 and the rim portion 62 of the valve housing 52 to facilitate rotation of the vale flap 58 relative to the valve housing 52 between the first and second positions.

An annular pad 110 may be attached (e.g., spot welded) to a surface 112 of the body 98 along a periphery thereof and may be sealingly engaged with a surface 114 of the valve seat 60 along the periphery of the opening 64 when the valve flap 58 is in the first position. The pad 110 may be made of a wire-mesh material or any other suitable material that reduces noise as the pad 110 is sealingly engaged with the surface 114 of the valve seat 60 along the periphery of the opening 64. The pad 110 may also be flat and may be concentric to the opening 64. In some configurations, the pad 110 may be attached to the valve seat 60 as oppose to the body 98. In such configurations, the body 98 may be sealingly engaged with the pad 110 when in the first position.

Figure 6:
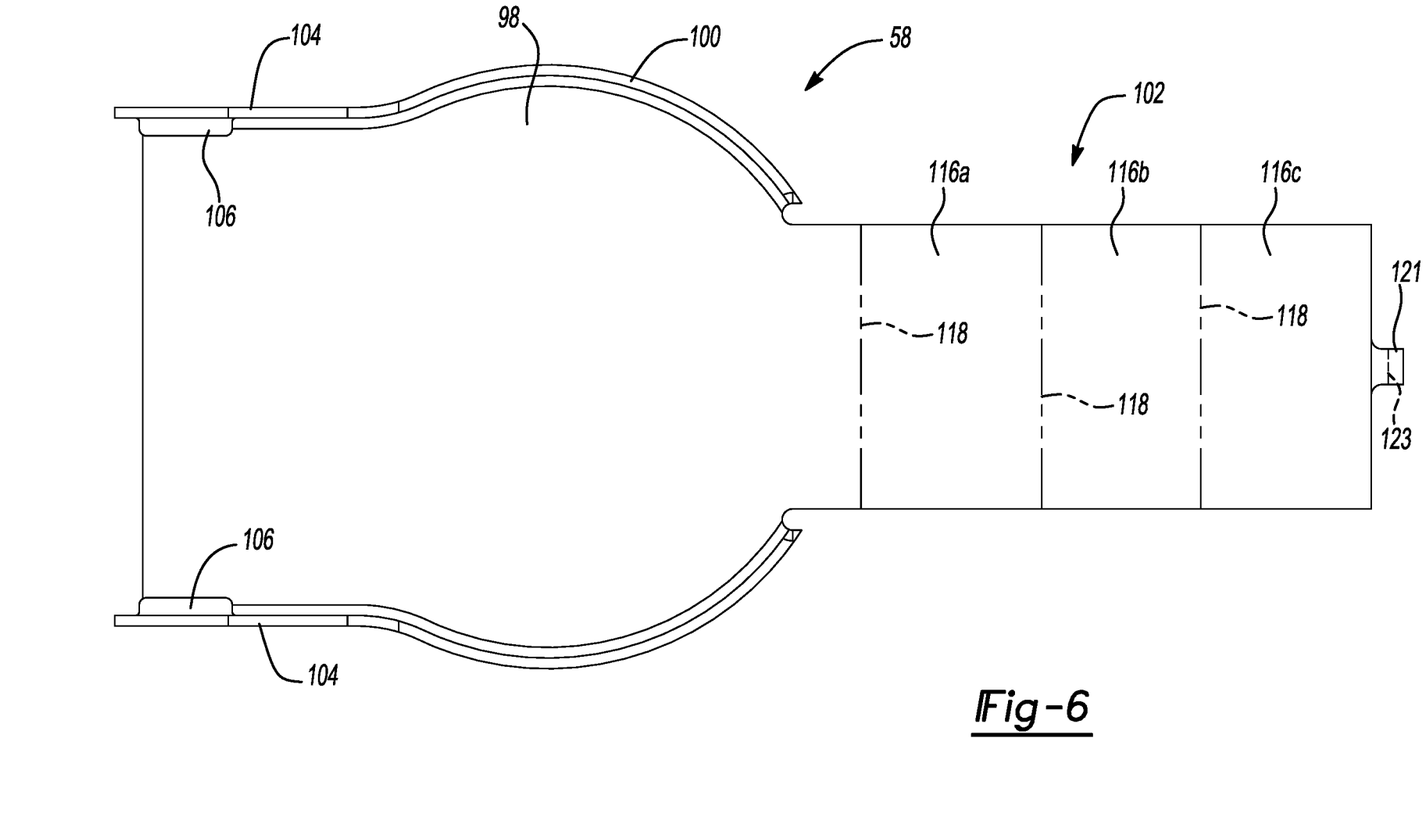
FIG. 6 is a plan view of a valve flap of the damper valve assembly prior to a mass damper being folded.
Figures 7, 8:
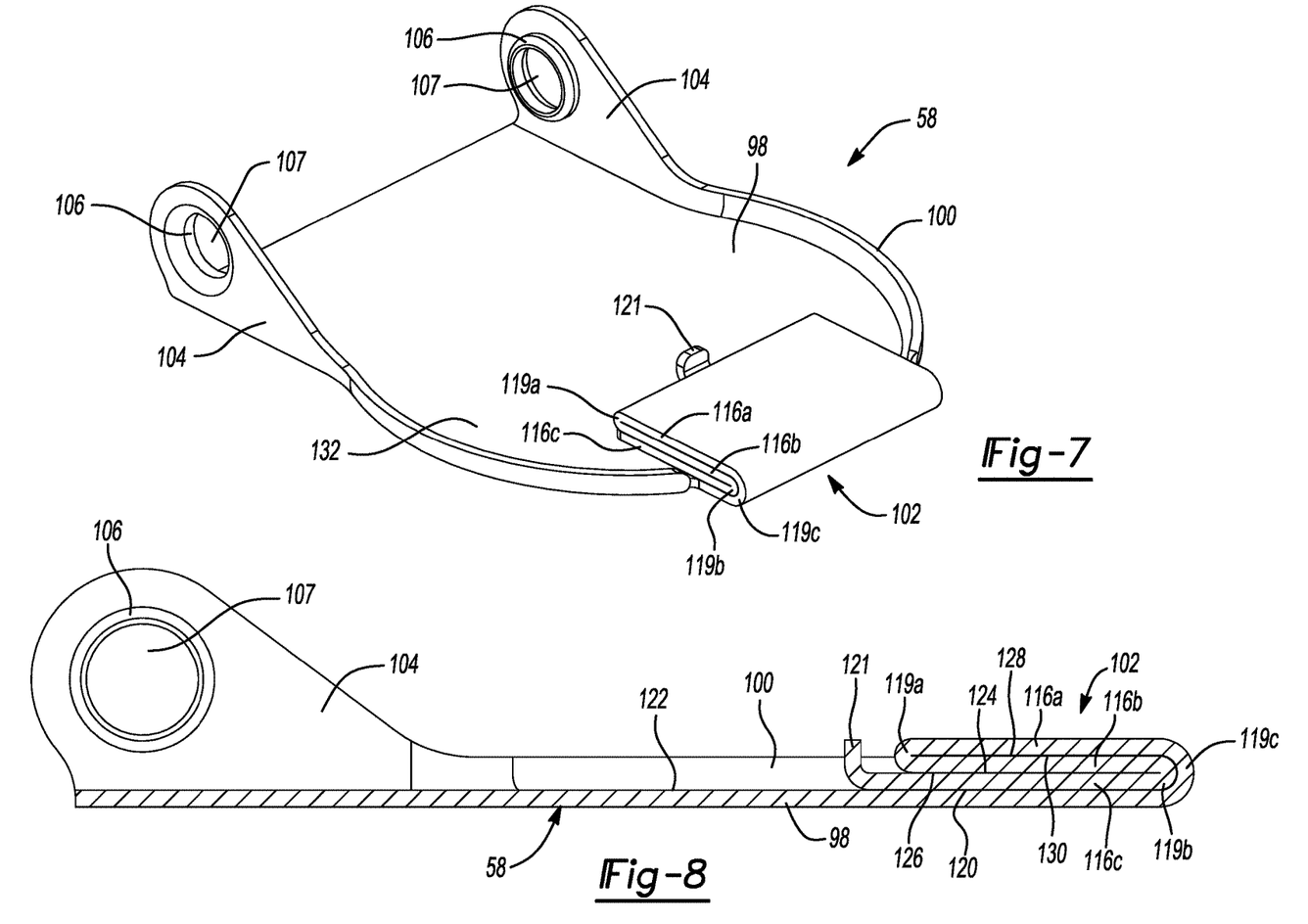
FIG. 7 is a perspective view of the valve flap of the damper valve assembly after the mass damper is folded.
FIG. 8 is side view of the mass damper after being folded.

With reference to FIGS. 6-8, the mass damper 102 may be integral with the body 98 of the valve flap 58 at a periphery thereof and may be comprised of a plurality of segments 116 (comprised of a first segment 116a, a second segment 116b and a third segment 116c) and a clip 121. The plurality of segments 116 are folded about fold lines 118 (phantom lines). In this way, the plurality of segments 116 are in a stacked arrangement (i.e., are stacked on top of one another). It should be understood that although three segments are shown, the mass damper 102 may be comprised of more or less segments depending on the flowrate fluctuations in the engine 12 exhaust flow, for example. That is, depending on the magnitude of the flowrate fluctuations, the mass damper 102 may include more or less segments 116, thereby varying the inertia of the mass damper 102 and preventing noise generated by the valve flap 58 during the flowrate fluctuations. In some configurations, the plurality of segments 116 may be rolled as opposed to folded about the fold lines 118.

As shown in FIG. 6, the valve flap 58 is shown with the mass damper 102 unfolded (i.e., the plurality of segments 116 not stacked on one another). As shown in FIG. 7, each segment 116a, 116b, 116c may be folded about a respective fold line 118 such that bends 119a, 119b, 119c are created in the mass damper 102 and the plurality of segments 116 are in a stacked fashion (or overlap). The plurality of segments 116 are parallel to each other and to the body 98 when in the stacked arrangement. The plurality of segments 116 may be perpendicular to the longitudinal axis of the valve pipe 29 when the valve flap 58 is in the first position and substantially parallel to the longitudinal axis of the valve pipe 29 when the valve flap 58 is in the second position. After each segment 116a, 116b, 116c is folded about the respective fold line 118, the mass damper is pressed to the body 98. In this way, as shown in FIG. 8, a first side 120 of the segment 116c contacts a surface 122 of the body 98, a second side 124 of the segment 116c contacts a first side 126 of the segment 116b and a second side 128 of the segment 116b contacts a first side 130 of the segment 116a. The bend 119c covers or partially wraps around the bend 119b.

Figure 4:
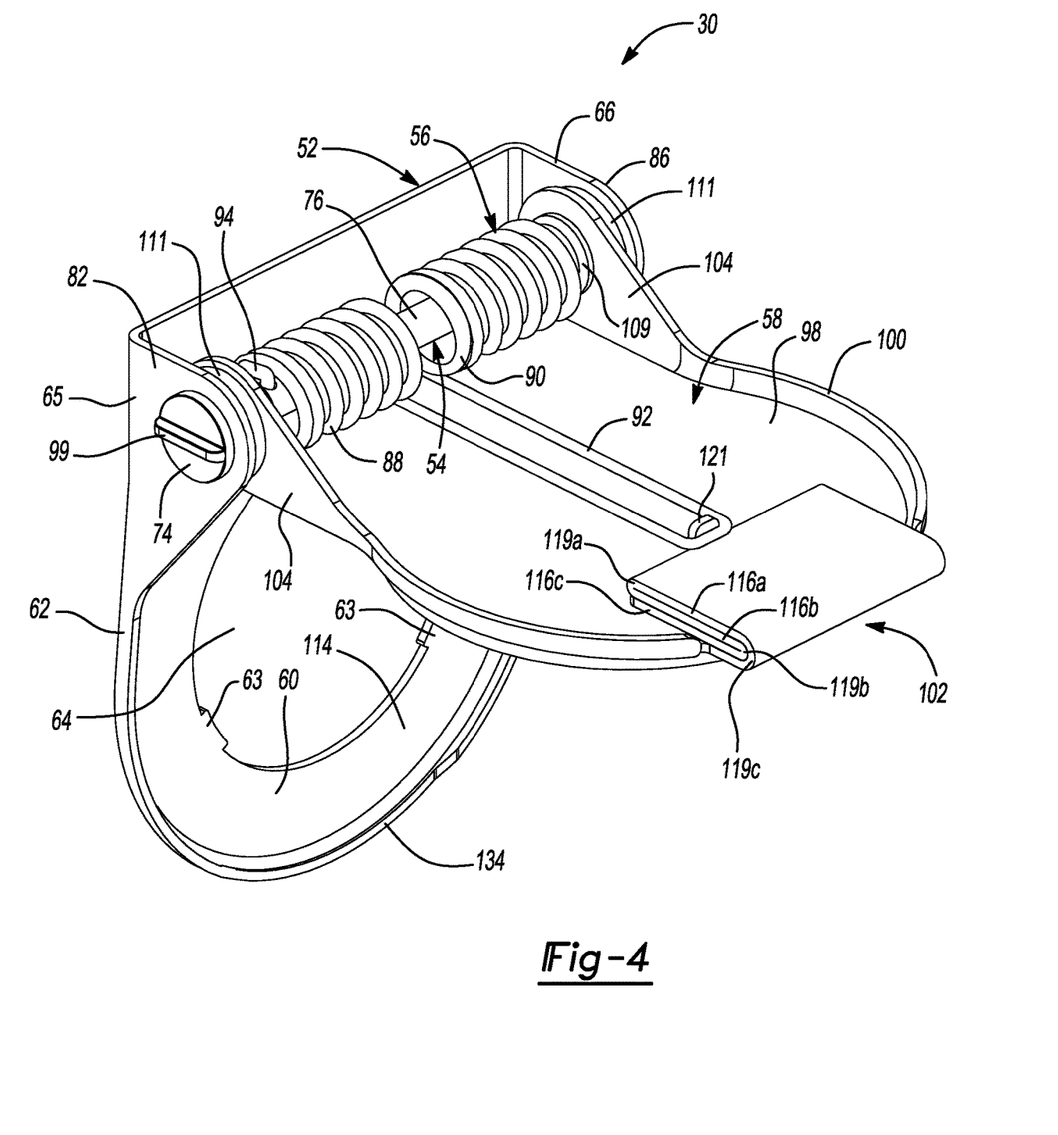
FIG. 4 is a perspective view of the damper valve assembly of FIG. 2 in an open position.

As shown in FIGS. 4-6, the rim portion 100 of the valve flap 58 may include a slot 132 that accommodates a portion of the mass damper 102 and the rim portion 62 of the valve housing 52 may include a slot 134 that accommodates a portion of the mass damper 102. Stated another way, the mass damper 102 may extend through the slots 132, 134 of the rim portions 100, 62, respectively. The clip or connecting member 121 may extend from the segment 116c and may also be folded about a fold line 123 (FIG. 6) to form an L-shape. The connecting portion 92 of the spring 56 may be coupled to the clip 121 such that the spring 56 biases the valve flap 58 toward the first position.

With continued reference to FIGS. 1-8, operation of the valve assembly 30 will be described in detail. When the pressure differential between chamber 38d and chamber 38b is below a predetermined value, the damper valve assembly 30 is in the closed position and fluid is not allowed to flow therethrough. When the damper valve assembly 30 is in the closed position, the mass damper 102 and the spring 56 prevent the valve flap 58 from moving and making noises when exhaust pulsations are experienced. When the pressure differential between chamber 38b and 38d exceeds a predetermined value, the valve flap 58 moves from the closed position to the open position and fluid in the valve pipe 29 may exit through the outlet opening 50.

With reference to FIGS. 9-14, another damper valve assembly 230 may be incorporated into the valve pipe 29 instead of damper valve assembly 30. The structure and function of the damper valve assembly 230 may be similar or identical to the damper valve assembly 30 described above, apart from any exception noted below.

With reference to FIGS. 9-14, the damper valve assembly 230 may include a valve housing 252 (FIGS. 9-11), a shaft 254 (FIGS. 9-11), a torsional spring 256 (FIGS. 9-11) and a valve flap 258. The valve housing 252 may be attached (e.g., welded) to the flared end 59 of the valve pipe 29 at or near the outlet opening 50. The valve housing 252 may include a valve seat 260, a rim portion 262, and a bracket portion 263. The valve seat 260 may define a generally circular opening 264. The valve seat 260 may include a plurality of rectangular-shaped tabs 267 that extend into the opening 264. The tabs 267 may be spaced apart 120 degrees from each other. The tabs 267 may act as a stop to prevent the valve pipe 29 from extending into the opening 264. The tabs 267 may also be used as a locating feature (i.e., rotationally positioning the valve pipe 29 relative to the valve housing 252) such that the valve pipe 29 and the valve housing 252 may be attached (e.g., welded) to each other at the tabs 267.

Figure 11:
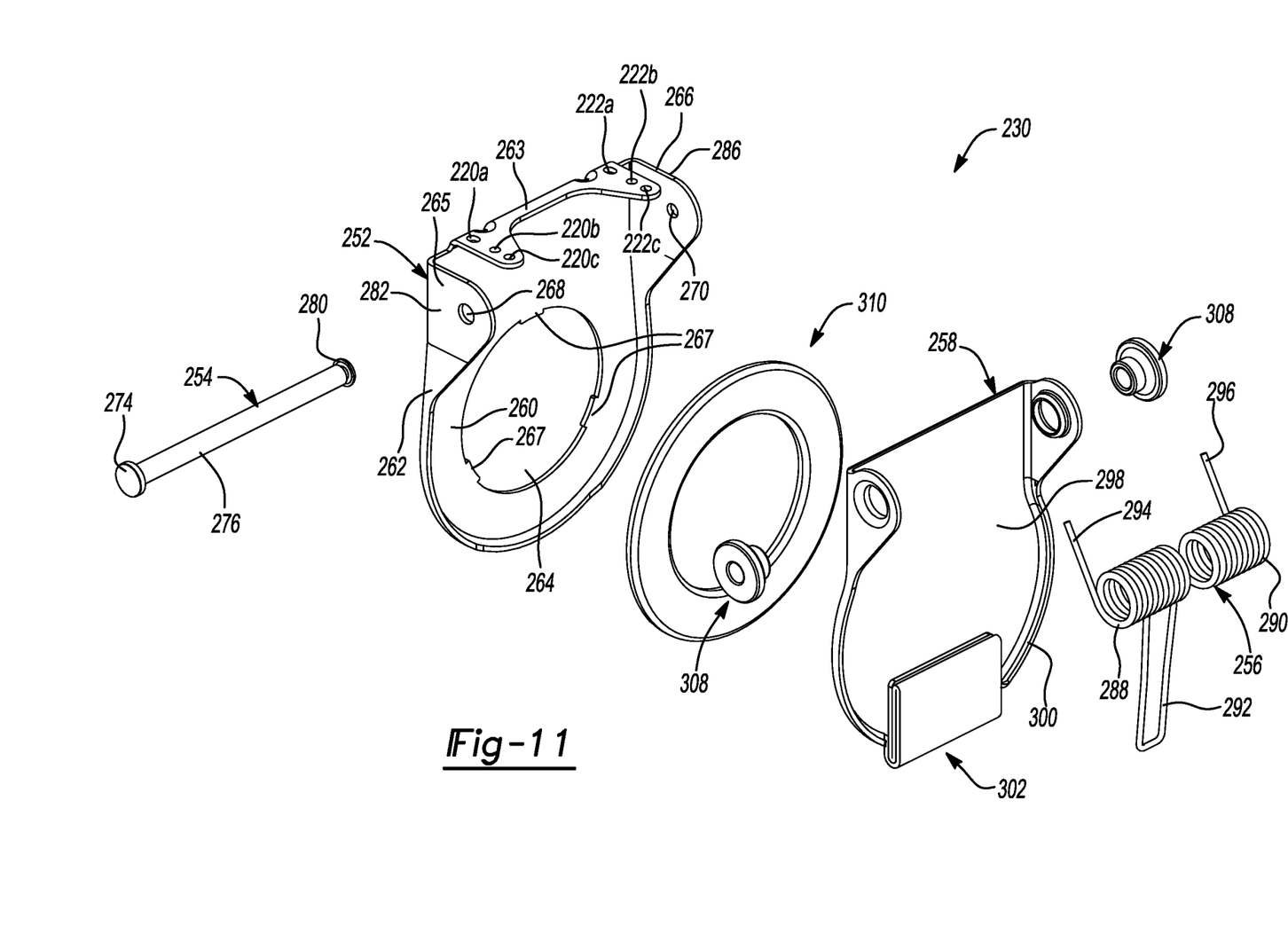
FIG. 11 is an exploded perspective view of the alternate damper valve assembly.

The rim portion 262 may extend at least partially around a periphery of the valve seat 260. The rim portion 262 may be attached (e.g., welded) to the flared end 59 of the valve pipe 29 at or near the outlet opening 50. Opposing ends or flanges 265, 266 of the rim portion 262 may include openings 268, 270, respectively, that are aligned with each other. The opening 270 may have a smaller diameter than a diameter of the opening 268.

The bracket portion 263 may extend from the valve seat 260 and between the flanges 265, 266 of the rim portion 262. The bracket portion 263 may include a first set of openings 220 (comprised of a first opening 220a, a second opening 220b and a third opening 220c) at one end and a second set of openings 222 (comprised of a first opening 222a, a second opening 222b and a third opening 222c) at the other end. Each opening 220a, 220b, 220c of the first set of openings 220 are vertically aligned with each other and each opening 222a, 222b, 222c of the second set of openings 222 are vertically aligned with each other. The openings 220a and 222a are horizontally aligned with each other, the openings 220b and 222b are horizontally aligned with each other, and the openings 220c and 222c are horizontally aligned with each other.

The shaft 254 may extend transverse (i.e., perpendicular relative to a longitudinal direction of the valve pipe 29) to the valve pipe 29 and may have an axis that is offset from the opening 264 in the valve seat 260. The shaft 254 may extend through the valve flap 258 and through the openings 268, 270 of the opposing ends 265, 266, respectively. The shaft 254 may include a head portion 274, a body portion 276 and an end portion 280. The head portion 274 may be in contact with an outer surface 282 of the end 265 of the rim portion 262. When the shaft 254 extends through the valve flap 258 and through openings 268, 270 of the opposing flanges 265, 266, an end portion of the shaft 254 may be mechanically deformed to form the radially extending flange 280. The flange 280 may be in contact with an outer surface 286 of the flange 266 of the rim portion 262.

Figure 9:
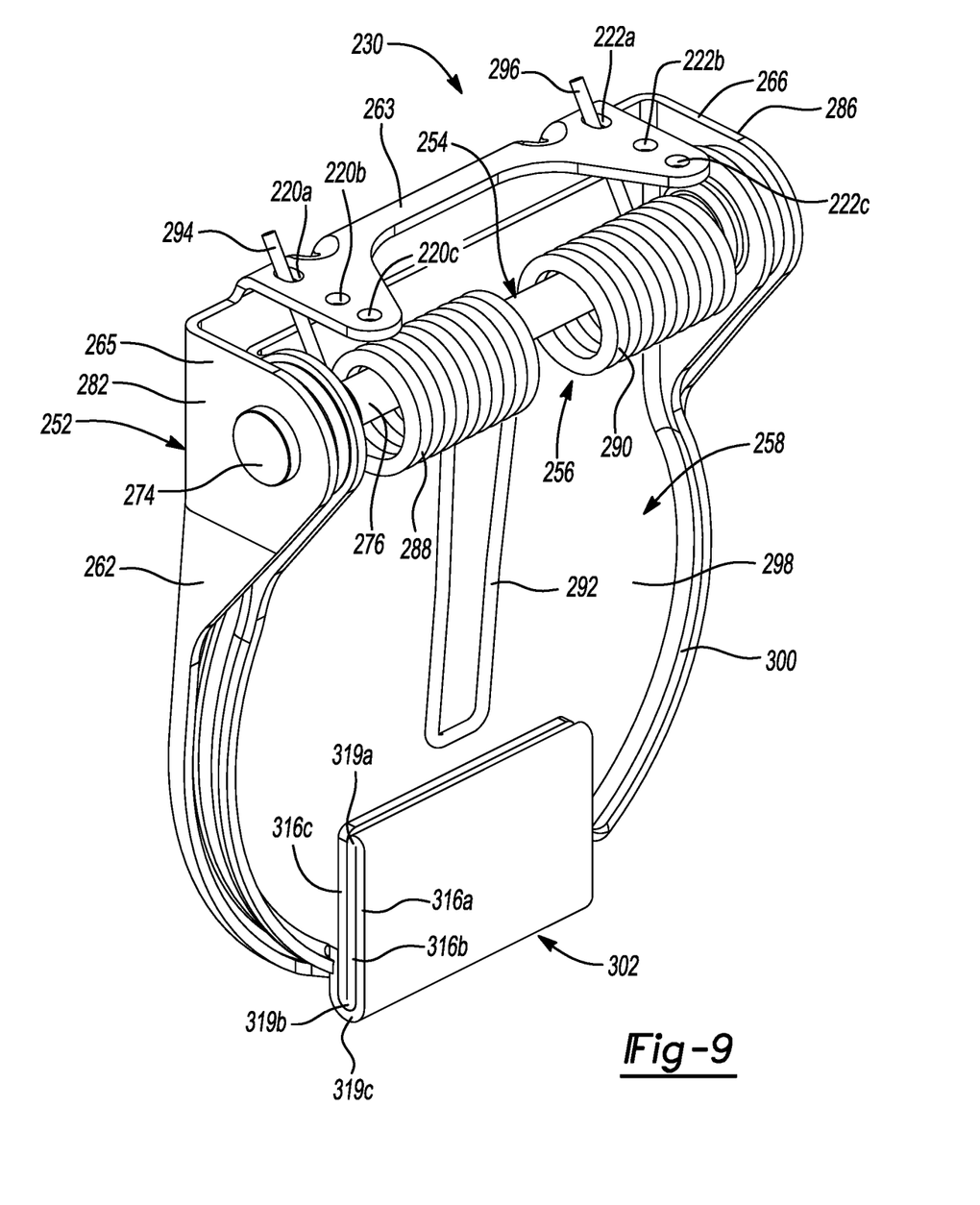
FIG. 9 is a perspective view of an alternate damper valve assembly in a closed position.
Figure 10:
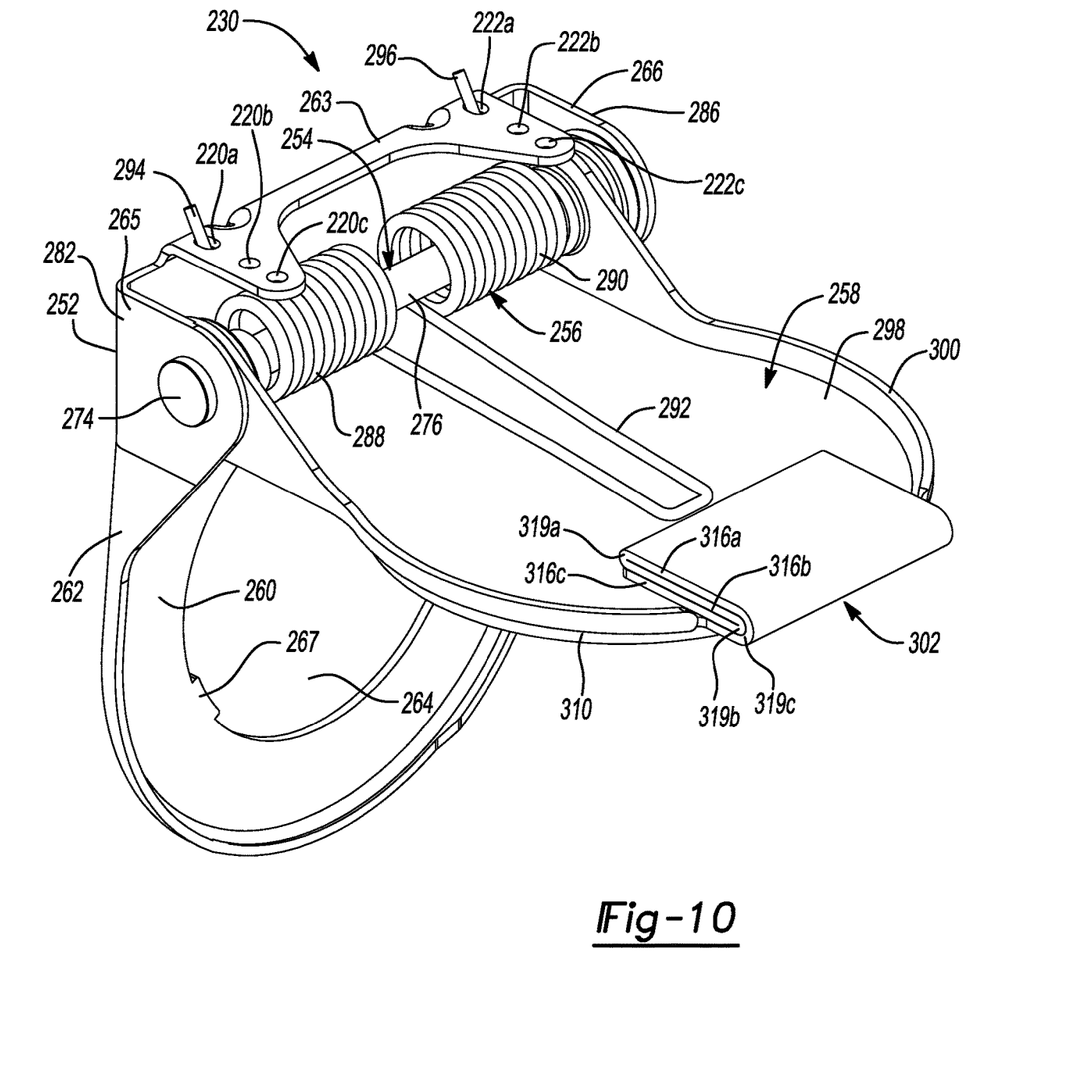
FIG. 10 is a perspective view of the alternate damper valve assembly in an open position.

As shown in FIGS. 9 and 10, the torsional spring 256 may be disposed around the body portion 276 of the shaft 254 and may include a first coil 288, a second coil 290 and a U-shaped connecting portion 292. An end 294 of the first coil 288 may be engaged with the bracket portion 263 (i.e., the end 294 is disposed in one of the openings 220 of the bracket portion 263) and an end 296 of the second coil 290 may also be engaged with the bracket portion 263 (i.e., the end 296 is disposed in one of the openings 222 of the bracket portion 263). The connecting portion 292 may be positioned between the first and second coils 288, 290 and may be coupled to the valve flap 258. In this way, the valve flap 258 is rotationally biased toward a first position (i.e., a closed position).

The pressure differential between fluid chamber 38d and chamber 38b that causes the valve flap 258 to move from the first position toward a second position (i.e., an open position) may be varied depending on the opening 220a, 220b, 220c that the end 294 of the first coil 288 is disposed in and the opening 222a, 222b, 222c that the end 296 of the second coil 290 is disposed in. A torsional spring preload is set based on the attachment position of ends 294, 296 of spring 256. Different attachment points provide a different torsional spring preload. For example, if the end 294 of the first coil 288 is disposed in the opening 220a and the end 296 of the second coil 290 is disposed in the opening 222a then a lesser pressure differential between chamber 38d and chamber 38b would be required to move the valve flap 258 from the closed position to the open position then if the end 294 of the first coil 288 is disposed in the opening 220b and the end 296 of the second coil 290 is disposed in the opening 222b. Similarly, if the end 294 of the first coil 288 is disposed in the opening 220b and the end 296 of the second coil 290 is disposed in the opening 222b then a lesser pressure differential between chamber 38d and chamber 38b would be required to move the valve flap 258 from the closed position to the open position then if the end 294 of the first coil 288 is disposed in the opening 220c and the end 296 of the second coil 290 is disposed in the opening 222c.

The torsional spring preload may be made up of a first component from the first coil 288 and a second component from the second coil 290. If the ends 294, 296 are disposed in horizontally aligned openings, then the first component and the second component of the torsional spring preload may be equal. For example, if the end 294 is disposed in the opening 220a and the end 296 is disposed in the opening 222a, the torsional spring may exert a load on the valve flap 258 such that the pressure difference required to move the valve flap 258 is 2 kPa (i.e., the first component being 1 kPa and the second component being 1 kPa). In another example, if the end 294 is disposed in the opening 220b and the end 296 is disposed in the opening 222b, the torsional spring may exert a load on the valve flap 258 such that the pressure difference required to move the valve flap 258 is 4 kPa (i.e., the first component being 2 kPa and the second component being 2 kPa)

It should also be understood that the ends 294, 296 may be disposed in horizontally offset openings. If the ends 294, 296 are disposed in horizontally offset openings, then the torsional spring preload may be different than if the ends 294, 296 are disposed in horizontally aligned openings and the first component and the second component of the torsional spring preload may different. For example, if the end 294 is disposed in the opening 220a and the end 296 is disposed in the opening 222b, the torsional spring may exert a load on the valve flap 258 such that the pressure difference required to move the valve flap 258 is 3 kPa (i.e., the first component being 1 kPa and the second component being 2 kPa). In another example, if the end 294 is disposed in the opening 220b and the end 296 is disposed in the opening 222c, the torsional spring may exert a load on the valve flap 258 such that the pressure difference required to move the valve flap 258 is 5 kPa (i.e., the first component being 2 kPa and the second component being 3 kPa).

The valve flap 258 may be coupled for rotation with the shaft 254. The valve flap 258 may be rotatable about the axis of the shaft 254 between the first position (i.e., closed position) whereat fluid flowing in the valve pipe 29 is restricted from flowing through the outlet opening 50 of the valve pipe 29 and a second position (i.e., open position) whereat fluid flowing in the valve pipe 29 is allowed to flow through the outlet opening 50 of the valve pipe 29.

As shown in FIGS. 9-14, the valve flap 258 may include a body 298, a rim portion 300 and a mass damper 302. The rim portion 300 may be similar or identical to the rim portion 100 described above, and therefore, will not be described again in detail. An annular pad 310 may be similar or identical to the pad 310 described above, and therefore, will not be described again in detail. Each wire-mesh bushing 308 may be similar or identical to that of the bushings 108 described above, and therefore, will not be described again in detail.

Figure 12:
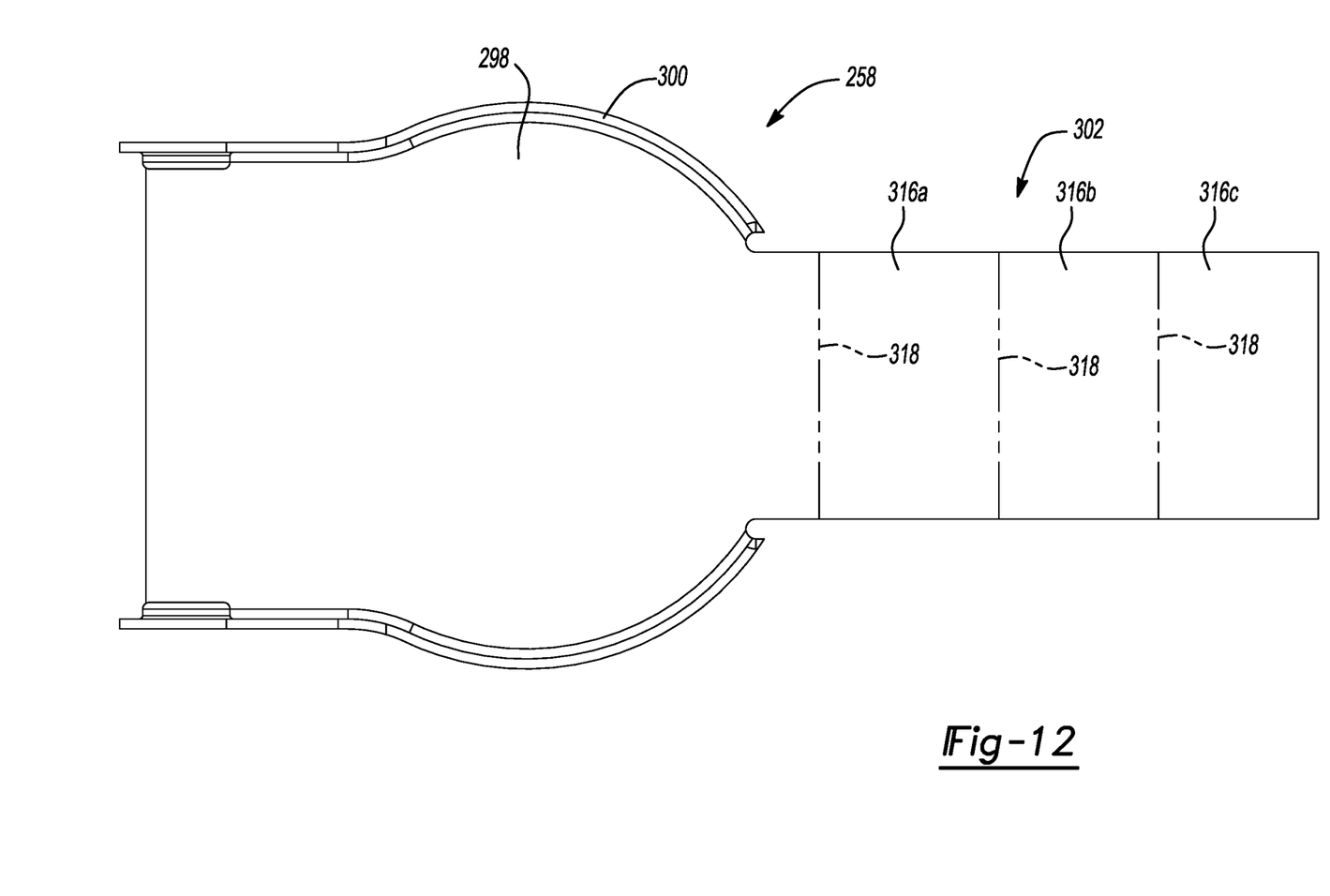
FIG. 12 is a plan view of a valve flap of the alternate damper valve assembly prior to a mass damper being folded.
Figures 13, 14:
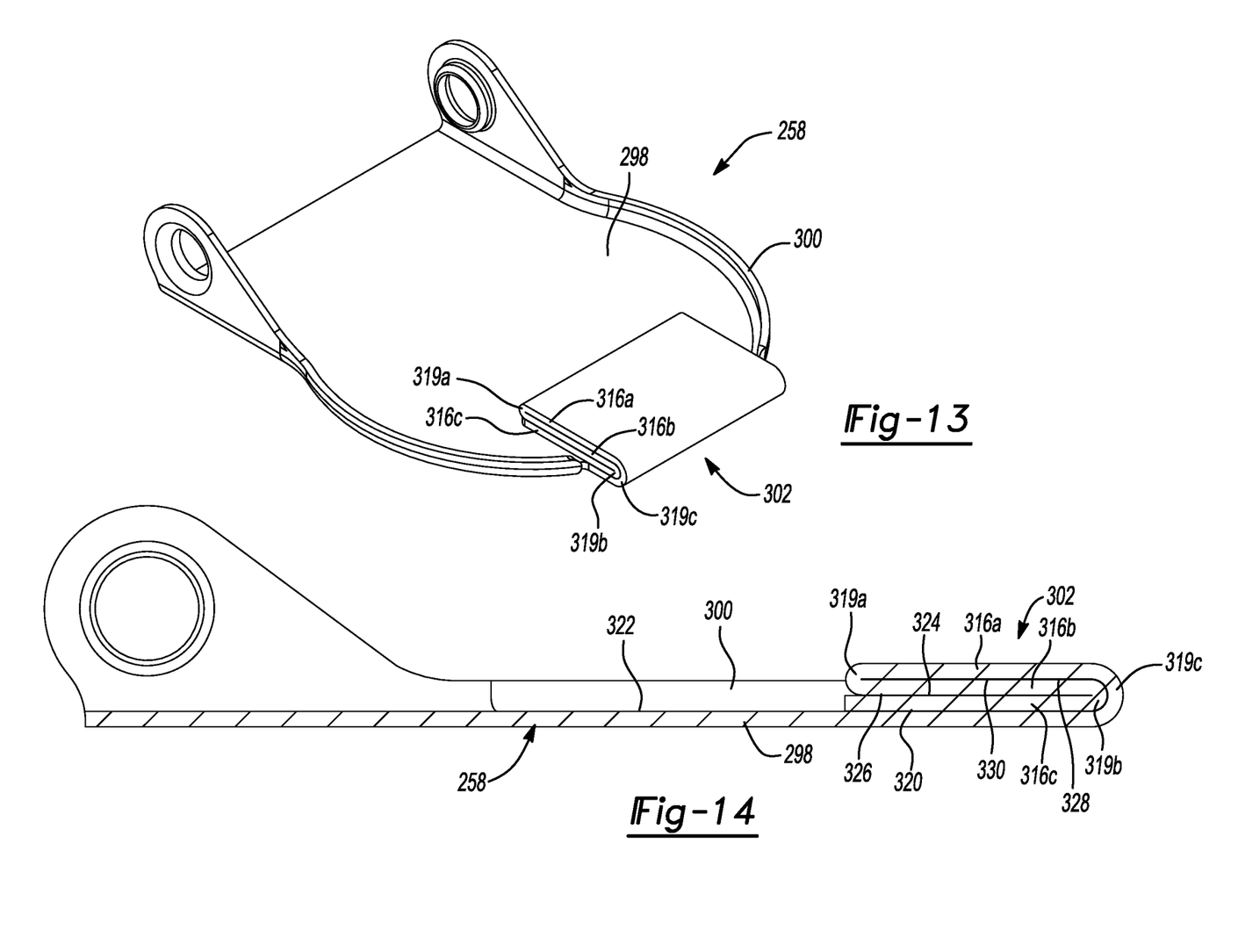
FIG. 13 is a perspective view of the valve flap of the alternate damper valve assembly after the mass damper is folded.
FIG. 14 is side view of the mass damper of the alternate damper valve assembly after being folded.

With reference to FIGS. 12-14, the mass damper 302 may be integral with the body 298 of the valve flap 258 at a periphery thereof and may be comprised of a plurality of segments 316 (comprised of a first segment 316a, a second segment 316b and a third segment 316c) that are folded about fold lines 318 (dotted lines). In this way, the plurality of segments 316 are in a stacked arrangement (or overlap).

As shown in FIG. 12, the valve flap 258 is shown with the mass damper 302 unfolded (i.e., the plurality of segments 316 not stacked on one another). Each segment 316a, 316b, 316c may be folded about a respective fold line 318 such that bends 319a, 319b, 319c are created in the mass damper 302 and the plurality of segments 316 are in a stacked fashion (or overlap). The plurality of segments 316 are parallel to each other and to the body 298 when stacked on each other. The plurality of segments 316 may be perpendicular to the longitudinal axis of the valve pipe 29 when the valve flap 258 is in the first position and substantially parallel to the longitudinal axis of the valve pipe 29 when the valve flap 258 is in the second position. After each segment 316a, 316b, 316c is folded about the respective fold line 318, the mass damper 302 is pressed to the body 298. In this way, as shown in FIG. 14, a first side 320 of the segment 316c contacts a surface 322 of the body 298, a second side 324 of the segment 316c contacts a first side 326 of the segment 316b and a second side 328 of the segment 316b contacts a first side 330 of the segment 316a. The bend 319c covers or partially wraps around the bend 319b.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A damper valve assembly for an exhaust system of a vehicle, the damper valve assembly comprising:
    a valve housing adapted to be attached to a pipe of the exhaust system and defining an opening; and
    a valve flap rotatably coupled to the valve housing about a pivot axis, the valve flap movable between a first position whereat fluid flow through the opening of the valve housing is restricted and a second position whereat fluid flow through the opening of the valve housing is allowed, the valve flap including a body and a mass damper,
    wherein the mass damper is integral with the body and includes a plurality of segments that are folded such that the plurality of segments are in a stacked arrangement.

2. The damper valve assembly of claim 1, wherein the mass damper is pressed to a first surface of the body of the valve flap once the plurality of segment are folded.

3. The damper valve assembly of claim 2, further comprising a pad attached to one of a second surface of the body and the valve housing, and wherein the pad is sealingly engaged with the valve housing and the valve flap along a periphery of the opening when the valve flap is in the first position.

4. The damper valve assembly of claim 1, wherein the plurality of segments are parallel to each other and to the body of the valve flap.

5. The damper valve assembly of claim 1, wherein the plurality of segments are folded about fold lines such that bends are created.

6. The damper valve assembly of claim 5, wherein one of the bends at least partially wraps around another one of the bends.

7. The damper valve assembly of claim 1, wherein the valve flap includes a first rim portion extending at least partially around a periphery of the body and the valve housing includes a second rim portion extending at least partially around a periphery of a valve seat, and wherein first and second slots in the first and second rim portions, respectively, accommodate the mass damper.

8. The damper valve assembly of claim 1, wherein the valve flap is in the first position when a pressure drop of fluid in the pipe is below a predetermined threshold and is moved to the second position when the pressure drop of fluid in the pipe is above the predetermined threshold.

9. A damper valve assembly for an exhaust system of a vehicle, the damper valve assembly comprising:
- a valve housing adapted to be attached to a pipe of the exhaust system and defining an opening;
- a shaft rotatably coupled to the valve housing;
- a valve flap rotatable about a pivot axis of the shaft between a first position whereat fluid flow through the opening of the valve housing is restricted and a second position whereat fluid flow through the opening of the valve housing is allowed, the valve flap including a body and a mass damper; and
- a spring engaging the valve flap to bias the valve flap toward the first position,
- wherein the mass damper is integral with the body at a periphery thereof and includes a plurality of segments that are folded such that the plurality of segments are in a stacked arrangement.

10. The damper valve assembly of claim 9, wherein the mass damper is pressed to a first surface of the body of the valve flap once the plurality of segments are folded.

11. The damper valve assembly of claim 10, further comprising a pad attached to a second surface of the body along a periphery thereof, and wherein the pad is sealingly engaged with the valve housing along a periphery of the opening when the valve flap is in the first position.

12. The damper valve assembly of claim 9, wherein the plurality of segments are parallel to each other and to the body of the valve flap.

13. The damper valve assembly of claim 9, wherein the plurality of segments are folded about fold lines such that bends are created and one of the bends at least partially wraps around another one of the bends.

14. The damper valve assembly of claim 9, wherein the valve flap includes a first rim portion extending at least partially around a periphery of the body and the valve housing includes a second rim portion extending at least partially around a periphery of a valve seat, and wherein the mass damper extends through first and second slots in the first and second rim portions, respectively.

15. The damper valve assembly of claim 9, wherein one of the segments includes a clip extending therefrom, and wherein the spring is disposed around the shaft and is engaged to the shaft and the clip to bias the valve flap toward the first position.

16. The damper valve assembly of claim 9, wherein the valve housing includes a bracket portion extending therefrom, and wherein the spring is disposed around the shaft and is engaged to the bracket portion and a surface of the body to bias the valve flap toward the first position.

17. The damper valve assembly of claim 9, wherein the spring includes a first portion fixed to the shaft and another portion engaging the valve flap to bias the valve flap toward the first position.

18. A damper valve assembly for an exhaust system of a vehicle, the damper valve assembly comprising:
- a valve housing adapted to be attached to an end of a pipe of the exhaust system, the valve housing including a valve seat and an opening;
- a shaft coupled to the valve housing;
- a valve flap rotatable between a first position whereat the valve flap engages the valve seat and fluid flow through the opening of the valve housing is restricted and a second position whereat the valve flap is spaced apart from the valve seat and fluid flow through the opening of the valve housing is allowed, the valve flap including a body and a mass damper; and
- a spring engaging the valve flap to bias the valve flap toward the first position,
- wherein the mass damper and the body are formed from a single sheet, the mass damper including a plurality of segments that are folded such that the plurality of segments overlap one another.

19. The damper valve assembly of claim 18, wherein the mass damper is pressed to a first surface of the body of the valve flap once the plurality of segments are folded.

20. The damper valve assembly of claim 18, wherein the plurality of segments are folded about fold lines such that bends are created and one of the bends at least partially wraps around another one of the bends.

* * * * *